March 24, 1964     F. M. O. FOERSTER     3,125,953
SYSTEM FOR TRIGGERING DETONATION BODIES
Filed Aug. 23, 1960
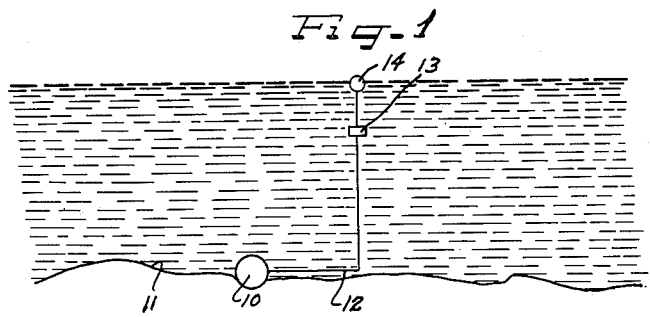
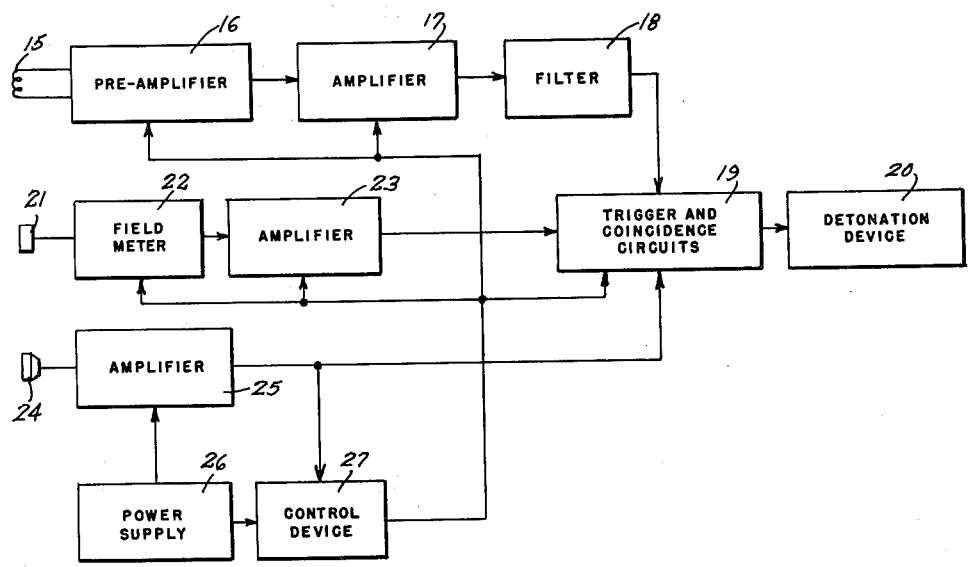
INVENTOR
Friedrich M. O. Foerster
BY
ATTORNEYS

3,125,953
SYSTEM FOR TRIGGERING DETONATION BODIES
Friedrich M. O. Foerster, Grathwohlstrasse 4, Reutlingen, Germany
Filed Aug. 23, 1960, Ser. No. 51,459
1 Claim. (Cl. 102—18)

This invention relates to a detonation system for mines, torpedoes and the like, for sensing the presence of bodies such as ships and to thereby trigger a detonation device. The system of this invention is particularly advantageous in that it will sense the presence of bodies such as mine sweepers, even though such bodies may be provided with neutralizing means such as would obviate response by prior art detonation systems.

In the early development of magnetic mines and the like, they were provided with magnetic field responsive devices, arranged to sense a distortion of the earth's field such as caused by a ship. Such mines were not entirely satisfactory in that they could be triggered by a magnetic field produced by a large coil or loop carried on a low-flying airplane. They might also be triggered by a field-producing device towed behind a mine sweeper, the mine sweeper being provided with a special degaussing coil system, to prevent distortion of the earth's field. Thus a field of the mines could be readily cleared. Subsequently, improved mines were developed which required not only a distortion of the earth's field, but also the presence of a pressure wave or noise signal such as caused by a ship. Such mines could not be triggered by a low-flying airplane. However, they could be cleared by use of a mine sweeper, with a pressure wave or noise-producing device towed therebehind in addition to a triggering coil.

This invention was evolved with the object of providing a detonation system which will detect the presence of mine sweepers and other bodies, even though provided with degaussing coils. Another object of the invention is to provide a detonation system which is highly sensitive, rugged and reliable in operation, and having minimum power consumption.

The present invention is based in part upon the discovery that A.C. fields of substantial magnitudes are produced by many bodies, and especially by bodies such as mine sweepers which are provided with neutralizing means such as degaussing coils. It has been discovered that in the operation of such degaussing coils, A.C. fields of high amplitudes are inherently and unavoidably produced. According to this invention, a sensing device such as a coil is provided for responding to an A.C. magnetic field to produce an A.C. voltage signal. The A.C. voltage signal is amplified and is applied to a detonation device. In operation, when the A.C. field exceeds a certain threshold value in the region of the sensing device, the detonation device is triggered.

According to an important feature of the invention, an electro-acoustical transducer is used to control a power supply for the A.C. voltage signal amplifier means, to apply power to the amplifier means only in response to a pressure wave or a noise signal produced by an approaching ship or other body. This has two important advantages. It minimizes power consumption, in that the power is applied only upon approach of a body. In addition, it serves to prevent triggering of the detonation device except in the presence of a body which will produce a pressure wave or a noise signal.

Another feature of the invention is in the support of the A.C. field-sensing device by means of a float, a short distance below the ocean's surface. This permits more sensitive operation.

Another feature is in the provision of filter means to limit the response of the system to a frequency range of ship-produced magnetic fields, and especially to the frequency range of signals produced by ship-degaussing systems.

Still another feature of the invention is in the provision of a probe arranged to respond to changes in the earth's field, and in its interconnection is a system including the A.C. field responsive means. This arrangement is so constructed as to respond either to an A.C. field such as might be produced by a mine sweeper having degaussing coils, or a distortion of the earth's field by a ship having a steel hull which might not produce high amplitude A.C. fields, but would distort the earth's field.

This invention contemplates other objects, features and advantages which will become more fully apparent from the following detailed description taken in conjunction with the accompanying drawing which illustrates a preferred embodiment and in which:

FIGURE 1 is a view illustrating schematically the support of an A.C. field responsive device below the ocean's surface, and connected to a detonation body; and FIGURE 2 is a schematic electrical diagram of the detonation system.

As shown in FIGURE 1, a detonation body 10, such as a mine, may be disposed on the ocean floor 11. The body 10 is connected through an electrical cable 12 to a housing 13, suspended from a float 14, at a certain distance below the ocean surface.

FIGURE 2 is a schematic diagram of the electrical system, some components of which may be located within the housing of the detonation body 10 and other components of which may be supported within the housing 13. An A.C. field responsive device in the form of a coil 15 is connected to the input of a preamplifier 16. Both the coil 15 and the preamplifier 16 may be located within the housing 13. The output of the preamplifier is connected to the input of a second amplifier 17 having its output connected through a filter 18 to trigger and coincidence circuits 19, connected to a detonation device 20 for the mine 10. The components 17–20 may preferably be located in the housing of the body 10.

A field-measuring probe 21 is provided to respond to variations in the earth field or the earth field gradient, such as might be caused by the proximity of a body of magnetic material. Probe 21 is connected to a field meter 22 the output of which is applied to the input of an amplifier 23 having its output applied to the trigger and coincidence circuits 19.

An electro-acoustical transducer 24 is provided to respond to acoustical pressure waves or noise, such as might be caused by the approach of a ship. The transducer 24 is connected to the input of an amplifier having its output connected to the trigger and coincidence circuits 19.

A power supply 26 continuously applies power to the amplifier 25, and also applies power to the components 16–19, 22 and 23 through a control device 27, controlled from the output of the amplifier 25.

In operation, the pressure waves or noise from an approaching ship impinge on the transducer 24 which, in response, generates an electrical signal. This signal is amplified by the amplifier 25 and applied to the control device 27 which connects the power supply 26 to the components 16–19, 22 and 23. The ship may generate A.C. fields or may cause a distortion of the earth field, or both. In the case of a ship with a steel hull, the A.C. fields may be minimized by the shielding effect of the hull. However, such ships produce a considerable distortion of the earth field. In the case of mine sweepers, on the other hand, such may have wooden hulls and are usually provided with degaussing coils, to minimize distortion of the earth field which might otherwise be caused by magnetic parts. However, it is found that the degaussing coil systems generate A.C. fields of substantial intensity.

Accordingly, as the ship approaches, a change in the earth field of substantial magnitude may be produced in the vicinity of the probe 21 or an A.C. field of substantial magnitude may be produced in the vicinity of the coil 15. In response to a change in the unidirectional field, the field meter 22 applies a signal to the amplifier 23 which applies an amplified signal to the trigger and coincidence circuits 19. When the signal is of predetermined amplitude, a triggering signal is applied from the circuits 19 to the detonation device 20. The trigger and coincidence circuits 19 may preferably be so arranged as to apply the triggering signal only when a signal is concurrently applied from the amplifier 25.

In a similar fashion, when an A.C. signal of predetermined amplitude is generated by the coil 15, the signal applied from the amplifier 17 through the filter 18 to the circuits 19 will be of such amplitude as to cause application of a triggering signal to the detonation device 20. Here again, the coincidence circuits 19 are preferably so arranged as to apply the triggering signal only when a signal of a certain amplitude is applied from the output of the amplifier 25.

The filter 18 is preferably arranged to pass a frequency band in the range of ship-produced fields. Preferably, it should pass all frequencies in the range from about 50 to 1000 cycles per second, which is the range of the major frequencies produced by the degaussing coil systems of mine sweepers.

The amplifiers and other circuits are preferably transistorized, to obtain a rugged construction, reliable performance, compactness and minimum power consumption. This is particularly true of the preamplifier 16 which may be mounted within the float-suspended housing 13.

It will be observed that although the system will respond to the approach of a ship, regardless of type, it is not readily actuated artificially by mine sweeper systems.

It will be understood that modifications and variations may be effected without departing from the spirit and scope of the novel concepts of this invention.

I claim as my invention:

In a mine detonation system, means for sensing A.C. magnetic fields to produce an A.C. voltage signal, first amplifier means having an input connected to said sensing means to respond to said A.C. voltage signal and to develop a first amplified signal, second amplifier means responsive to said first amplified signal to develop a second amplified signal of higher intensity, a detonation device, triggering means connected to said second amplifier means to respond to said second amplified signal and connected to said detonation device to trigger said device when the amplitude of said second amplified signal exceeds a certain value, a power supply, a control device connecting said power supply to said first and second amplifier means, an electro-acoustical device, third amplifier means having an input connected to said electro-acoustical device and having an output connected to said control device to control said control device and to apply power from said power supply to said first and second amplifier means when the output of said electro-acoustical device exceeds a certain value.

References Cited in the file of this patent
UNITED STATES PATENTS

| | | |
|---|---|---|
| 2,379,447 | Lindsey | July 3, 1945 |
| 2,892,403 | Glennon et al. | June 30, 1959 |
| 2,958,280 | Gilfillan et al. | Nov. 1, 1960 |
| 2,981,184 | Kennel et al. | Apr. 25, 1961 |
| 3,012,503 | Brown et al. | Dec. 12, 1961 |